United States Patent
Lee et al.

(10) Patent No.: US 10,042,209 B2
(45) Date of Patent: Aug. 7, 2018

(54) OPTICAL ANISOTROPIC FILM

(71) Applicant: LG CHEM, LTD., Seoul (KR)

(72) Inventors: Sung Kyoung Lee, Daejeon (KR);
Dong Woo Yoo, Daejeon (KR);
Sung-Ho Chun, Daejeon (KR); Dai Seung Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 79 days.

(21) Appl. No.: 14/419,176

(22) PCT Filed: Aug. 21, 2013

(86) PCT No.: PCT/KR2013/007498
§ 371 (c)(1),
(2) Date: Feb. 2, 2015

(87) PCT Pub. No.: WO2014/030926
PCT Pub. Date: Feb. 27, 2014

(65) Prior Publication Data
US 2015/0241738 A1 Aug. 27, 2015

(30) Foreign Application Priority Data

Aug. 21, 2012 (KR) .................. 10-2012-0091435
Aug. 20, 2013 (KR) .................. 10-2013-0098730

(51) Int. Cl.
*G02F 1/1337* (2006.01)
*C09K 19/02* (2006.01)
(Continued)

(52) U.S. Cl.
CPC ........ *G02F 1/133788* (2013.01); *C09K 19/02* (2013.01); *G02F 1/133711* (2013.01);
(Continued)

(58) Field of Classification Search
CPC ......... G02F 1/133711; G02F 1/133788; G02F 1/13362; G02F 2001/133633; G02B 1/04;
(Continued)

(56) References Cited

U.S. PATENT DOCUMENTS

| 5,464,669 A | 11/1995 | Kang et al. |
| 2008/0160222 A1* | 7/2008 | Harding ................. B82Y 30/00 428/1.26 |

(Continued)

FOREIGN PATENT DOCUMENTS

| JP | 11-181127 A | 7/1999 |
| JP | 11-202333 A | 7/1999 |

(Continued)

OTHER PUBLICATIONS

Andrey Dyaduysha, et al. "Peculiarity of an Oblique Liquid Crystal Alignment Induced by a Photosensitive Orientant", Jpn. J. Appl. Phys., vol. 34 (1995), pp. L1000-L1002, Part 2, No. 8A, Aug. 1, 1995.

(Continued)

*Primary Examiner* — Ruiyun Zhang
(74) *Attorney, Agent, or Firm* — Dentons US LLP

(57) ABSTRACT

This invention relates to an optical anisotropic film wherein liquid crystals of a liquid crystal layer can be more effectively aligned using a photo-alignment layer, and superior stability of liquid crystal alignment and high interaction between the liquid crystal layer and the photo-alignment layer can be exhibited, and to an optical device including the optical anisotropic film. The optical anisotropic film includes a substrate having P (polarity) of 0.01 to 0.35 as defined by a predetermined equation; a photo-alignment layer formed on the substrate and including a photo-alignment polymer in which at least a portion of a photo-reactive group is optically aligned, with P (polarity) of 0.02 to 0.28;

(Continued)

and a liquid crystal layer formed on the photo-alignment layer.

7 Claims, 1 Drawing Sheet

(51) Int. Cl.
  *C09K 19/04* (2006.01)
  *C09K 19/20* (2006.01)
  *G02F 1/13363* (2006.01)
(52) U.S. Cl.
  CPC .................. *B32B 2457/202* (2013.01); *C09K 2019/0448* (2013.01); *C09K 2019/2078* (2013.01); *G02F 2001/133633* (2013.01); *Y10T 428/1005* (2015.01); *Y10T 428/1036* (2015.01)
(58) Field of Classification Search
  CPC ............... C08L 23/18; Y10T 428/1005; Y10T 428/1036; C08G 2261/3324; C08G 2261/76; C08G 2261/148; C09K 19/56; B32B 2457/202
  USPC ........... 428/1.1, 1.2, 1.3; 349/117–119, 123, 349/127, 193; 252/299.4; 256/282; 526/282
  See application file for complete search history.

(56) References Cited

U.S. PATENT DOCUMENTS

2010/0296032 A1* 11/2010 Shin ...................... B32B 27/08
                                                              349/96
2011/0043731 A1* 2/2011 Shin ................... G02F 1/133711
                                                              349/96
2012/0076954 A1* 3/2012 Yoo ....................... C07C 69/734
                                                              428/1.2

FOREIGN PATENT DOCUMENTS

| | | |
|---|---|---|
| JP | 2000-330117 A | 11/2000 |
| JP | 2007-225765 A | 9/2007 |
| JP | 4154995 B2 | 9/2008 |
| JP | 2011-510345 A | 3/2011 |
| JP | 2011-511957 A | 4/2011 |
| JP | 2012-515228 A | 7/2012 |
| JP | 2012-145660 A | 8/2012 |
| JP | 2013-536546 A | 9/2013 |
| KR | 10-2002-0006819 A | 1/2002 |
| KR | 10-2002-0068195 A | 8/2002 |
| KR | 10-2009-0119285 A | 11/2009 |
| KR | 10-2010-0068178 A | 6/2010 |
| KR | 10-2010-0103550 A | 9/2010 |
| KR | 10-2012-0044883 A | 5/2012 |
| TW | 201204761 A | 2/2012 |
| TW | 201206964 A | 2/2012 |
| TW | 201209515 A | 3/2012 |
| TW | 201213356 A | 4/2012 |
| WO | 2010/080010 A2 | 7/2010 |
| WO | 2012/008814 A2 | 1/2012 |
| WO | 2012/046662 A1 | 4/2012 |

OTHER PUBLICATIONS

Martin Schadt, et al., "Surface-Induced Parallel Alignment of Liquid Crystals by Linearly Polymerized Photopolymers", Jpn. J. Appl. Phys., vol. 31 (1992), pp. 2155-2164, Part I, No. 7, Jul. 1992.

* cited by examiner

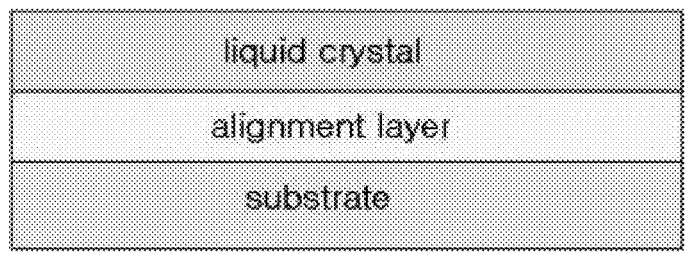

OPTICAL ANISOTROPIC FILM

This application is a National Stage Entry of International Application No. PCT/KR2013/007498, filed on Aug. 21, 2013, which claims priority to and the benefit of Korean Patent Application Nos. 10-2012-0091435, filed on Aug. 21, 2012 and 10-2013-0098730, filed on Aug. 20, 2013, all of which are incorporated herein by reference in their entirety.

FIELD OF THE INVENTION

The present invention relates to an optical anisotropic film. More particularly, the present invention relates to an optical anisotropic film, wherein liquid crystals of a liquid crystal layer may be more effectively aligned using a photo-alignment layer, and superior stability of liquid crystal alignment and high interaction between the liquid crystal layer and the photo-alignment layer may be exhibited, and to an optical device including the optical anisotropic film.

DESCRIPTION OF THE RELATED ART

With the recent trend of increasing the size of liquid crystal displays, their applications are expanding from personal devices such as mobile phones or notebook computers to home appliances such as wall-mountable TVs. Thus, liquid crystal displays are required to have high definition, high quality and wide viewing angles. In particular, because thin film transistor-liquid crystal displays (TFT-LCDs) driven by TFT allow respective pixels to independently operate, the response rate of liquid crystals becomes very high, making it possible to achieve high-definition video images. Accordingly, TFT-LCDs have a variety of applications.

In order for liquid crystals of TFT-LCDs to function as an optical switch, liquid crystals have to be initially aligned in a predetermined direction on a TFT layer located at the innermost position of a display cell. To this end, an alignment layer is utilized. Particularly, photo-alignment methods for orienting an alignment layer by light such as UV are being broadly reviewed these days.

Typically for such photo-alignment, a photo-alignment layer containing a photo-alignment polymer is formed under a liquid crystal layer, and then irradiated with linearly polarized UV so that an optical reaction takes place. As a result, photo-alignment in which the backbone of the photo-alignment polymer is arranged in a predetermined direction occurs, and the photo-alignment layer thus aligned has an influence on aligning liquid crystals contained in the liquid crystal layer located thereon.

Therefore, with the goal of more effectively aligning liquid crystals of the liquid crystal layer using a photo-alignment method, the photo-alignment layer alone should exhibit superior alignability, and furthermore, there is required high interaction between the photo-alignment layer and the liquid crystal layer. Moreover, the aligned liquid crystals should manifest superior alignment stability.

SUMMARY OF THE INVENTION

Accordingly, the present invention provides an optical anisotropic film, wherein liquid crystals of a liquid crystal layer may be more effectively aligned using a photo-alignment layer, and superior stability of liquid crystal alignment and excellent interaction between the liquid crystal layer and the photo-alignment layer may be exhibited.

In addition, the present invention provides an optical device, including the optical anisotropic film.

The present invention provides an optical anisotropic film, including a substrate having P (polarity) of 0.01 to 0.35 as defined by the following Equation 1; a photo-alignment layer formed on the substrate and including a photo-alignment polymer in which at least a portion of a photo-reactive group is optically aligned, with P (polarity) of 0.02 to 0.28 as defined by the following Equation 1; and a liquid crystal layer formed on the photo-alignment layer:

$$P \text{ (polarity)} = IFT(s,P)/IFT(s) \qquad \text{[Equation 1]}$$

wherein IFT(s, P) and IFT(s) are values obtained by substituting contact values of a water drop and a diiodomethane drop measured by positioning 10 µl of a water drop and 4 µl of a diiodomethane drop on the surface of the substrate or the photo-alignment layer, into the Owens-Wendt-Rabel-Kaelble equation.

In addition, the present invention provides an optical device including the optical anisotropic film.

Hereinafter, a detailed description will be given of an optical anisotropic film and an optical device according to embodiments of the present invention.

According to an embodiment of the present invention, an optical anisotropic film is provided, which includes a substrate having P (polarity) of 0.01 to 0.35 as defined by the following Equation 1; a photo-alignment layer formed on the substrate and including a photo-alignment polymer in which at least a portion of a photo-reactive group is optically aligned, with P (polarity) of 0.02 to 0.28 as defined by the following Equation 1; and a liquid crystal layer formed on the photo-alignment layer:

$$P \text{ (polarity)} = IFT(s,P)/IFT(s) \qquad \text{[Equation 1]}$$

wherein IFT(s, P) and IFT(s) are values obtained by substituting contact angles of a water drop and a diiodomethane drop measured by positioning 10 µl of a water drop and 4 µl of a diiodomethane drop on the surface of the substrate or the photo-alignment layer, into the Owens-Wendt-Rabel-Kaelble equation.

Thorough research carried out by the present inventors resulted in the finding that surface energy after photo-alignment of a photo-alignment layer is optimized, and thereby the photo-alignment layer enables liquid crystal molecules of the liquid crystal layer located thereon to be more effectively aligned, and good alignment of liquid crystal molecules of the liquid crystal layer may be more stably maintained, and also that the surface energy, in particular, P (polarity) defined by Equation 1, is optimized, thus further enhancing an interaction between the photo-alignment layer and the liquid crystal layer, and thereby liquid crystal molecules in the liquid crystal layer may be more effectively aligned, and the aligned liquid crystal molecules may exhibit further improved alignment stability.

As represented by Equation 1, P (polarity) may be deduced as the ratio of IFT(s, P) and IFT(s) determined by substituting the contact angles of a water drop and a diiodomethane drop on the surface of the substrate or photo-alignment layer into the Owens-Wendt-Rabel-Kaelble equation. As such, the contact angles of a water drop and a diiodomethane drop may be measured by positioning about 10 µl of a water drop and about 4 µl of a diiodomethane drop on the surface of the substrate or the photo-alignment layer at room temperature ranging from about 15 to 25° C. (e.g. respective liquid drops are gently formed and positioned on the surface of the substrate or the photo-alignment layer), and then measuring the angles of contact between the surface of the substrate or the photo-alignment layer and respective liquid drops using a process such as a Sessile drop process. The contact angles may be measured using a Drop Shape Analyzer (DSA; e.g. under brand name of DSA 100). When the contact angles of the water drop and the diiodomethane drop are measured in this way, the measured values are substituted into the Owens-Wendt-Rabel-Kaelble equation, thus calculating the values of IFT(s, P) and IFT(s) for the surface of the substrate or the photo-alignment layer, and P (polarity) for the substrate or the photo-alignment layer may be deduced as the ratio of these values.

The P (polarity) value may show the extent of polarity of the surface of the substrate or the photo-alignment layer. As the P (polarity) values of the surface of the substrate and the photo-alignment layer are optimized, the surface energy of the structure (i.e. substrate and photo-alignment layer) under the liquid crystal layer becomes optimal, thus further enhancing an interaction between the liquid crystal layer and the photo-alignment layer. That is, higher interaction between the photo-alignment polymer which is optically aligned and the liquid crystal molecules may result in superior characteristics and stability of liquid crystal alignment.

The optimal surface energy of the structure under the liquid crystal layer may be achieved by combining the substrate having optimal P (polarity) of about 0.01 to 0.35 with the photo-alignment layer having appropriate P (polarity) of about 0.02 to 0.28. More specifically, when the substrate having P (polarity) of about 0.01 to 0.03 is applied, it may be combined with the photo-alignment layer having P (polarity) of about 0.06 to 0.28, thus achieving optimal surface energy. Alternatively, when the substrate having P (polarity) of about 0.30 to 0.35 is applied, it may be combined with the photo-alignment layer having P (polarity) of about 0.02 to 0.2, and thus optimal surface energy may result. Accordingly, the structure under the liquid crystal layer, including the substrate and the photo-alignment layer, is optimized in surface energy, thus exhibiting superior characteristics and stability of liquid crystal alignment as above.

The optimal P (polarity) values of the substrate and the photo-alignment layer may result from the appropriate selection of substrate and photo-alignment polymer, the appropriate selection of binder compound which may be added to the photo-alignment layer, and the appropriate ratio of photo-alignment polymer to binder compound.

Below is a description of an optical anisotropic film according to an embodiment of the present invention, in order to obtain the optimal P (polarity) values of the substrate and the photo-alignment layer.

The substrate having an appropriate P (polarity) value may include a cellulose-based substrate such as a triacetyl cellulose (TAC) substrate, a cyclic olefin polymer (COP) substrate, a PET substrate or a cyclic olefin copolymer (COP) substrate.

For example, the cellulose-based substrate such as a TAC substrate may have P (polarity) of about 0.30 to 0.35 or about 0.31 to 0.32. While such a cellulose-based substrate is used, the P (polarity) of the photo-alignment layer may be adjusted to about 0.02 to 0.2 by appropriately using the photo-alignment polymer or the binder compound which will be described later or mixing the photo-alignment polymer and the binder compound at an appropriate ratio, thus achieving the optimal surface energy as above.

Alternatively, the cyclic olefin polymer or copolymer substrate or the PET substrate may have P (polarity) of about 0.01 to 0.03 or about 0.01 to 0.02. While such a substrate is used, the P (polarity) of the photo-alignment layer may be adjusted to about 0.06 to 0.28 by appropriately using the photo-alignment polymer or the binder compound or mixing the photo-alignment polymer and the binder compound at an appropriate ratio, thus achieving the optimal surface energy as above. Of the cyclic olefin polymer or copolymer substrate or the PET substrate, particularly useful is the cyclic olefin copolymer (COP) substrate in terms of obtaining appropriate P (polarity).

As mentioned above, as the surface energy is optimized, the optical anisotropic film according to an embodiment of the invention may exhibit superior characteristics and stability of liquid crystal alignment.

Meanwhile, in order for the photo-alignment layer to show appropriate P (polarity) of about 0.02 to 0.28, the photo-alignment layer may include a photo-alignment polymer having a repeating unit of Chemical Formula 1 or 2 below:

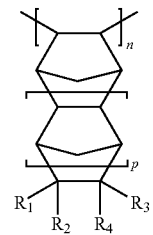

[Chemical Formula 1]

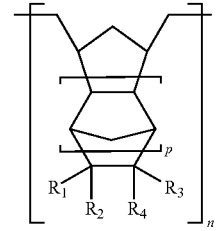

[Chemical Formula 2]

in Chemical Formulas 1 and 2, n is 50 to 5,000, p is an integer of 0 to 4, at least one of $R_1$, $R_2$, $R_3$ and $R_4$ is a radical selected from the group consisting of Chemical Formulas 1a to 1e below, and the others may be identical to or different from each other and are each independently a polar functional group selected from the group consisting of hydrogen; halogen; substituted or unsubstituted C1~C20 alkyl; substituted or unsubstituted C2~C20 alkenyl; substituted or unsubstituted C5~C12 cycloalkyl; substituted or unsubstituted C6~C40 aryl; substituted or unsubstituted C7~C15 aralkyl; substituted or unsubstituted C2~C20 alkynyl; and a non-hydrocarbonaceous polar group containing at least one element selected from among oxygen, nitrogen, phosphorus, sulfur, silicon and boron,

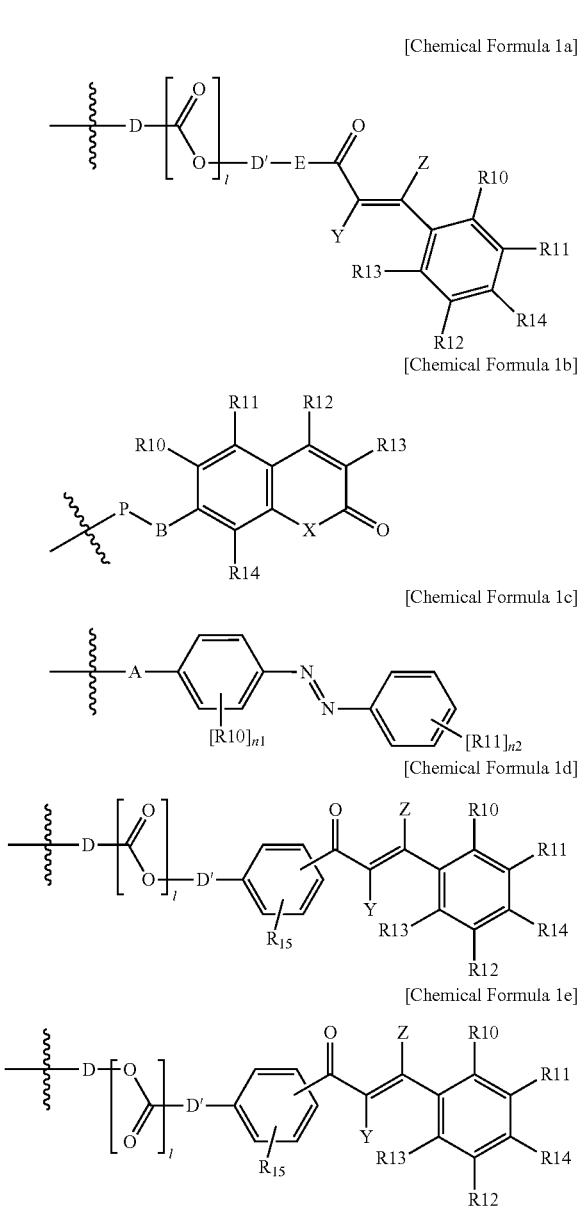

in Chemical Formulas 1a to 1e, n1 is an integer of 0 to 4, n2 is an integer of 0 to 5, and l is 0 or 1, A is substituted or unsubstituted C1~C20 alkylene, carbonyl, carboxyl, substituted or unsubstituted C6~C40 arylene, or a simple bond, B is selected from the group consisting of a simple bond; substituted or unsubstituted C1~C20 alkylene; carbonyl; carboxyl; ester; substituted or unsubstituted C1~C10 alkoxylene; substituted or unsubstituted C6~C40 arylene; and substituted or unsubstituted C6~C40 heteroarylene, D and D' are each independently selected from the group consisting of a simple bond; oxygen; substituted or unsubstituted C1~C20 alkylene; substituted or unsubstituted C3~C12 cycloalkylene; and substituted or unsubstituted C1~C20 alkyleneoxide, E is a simple bond; substituted or unsubstituted C1~C20 alkylene; or substituted or unsubstituted C6~C40 aryleneoxide, X is oxygen or sulfur, Y and Z are each independently hydrogen; or substituted or unsubstituted C1~C20 alkyl, P is selected from the group consisting of a simple bond; substituted or unsubstituted C1~C20 alkylene; carbonyl; substituted or unsubstituted C2~C20 alkenylene; substituted or unsubstituted C3~C12 cycloalkylene; substituted or unsubstituted C6~C40 arylene; substituted or unsubstituted C7~C15 aralkylene; substituted or unsubstituted C2~C20 alkynylene; and substituted or unsubstituted C4~C8 cycloalkylene, $R_{10}$, $R_{11}$, $R_{12}$, $R_{13}$ and $R_{14}$ are identical to or different from each other and are each independently selected from the group consisting of hydrogen; halogen; substituted or unsubstituted C1~C20 alkyl; substituted or unsubstituted C4~C8 cycloalkyl; substituted or unsubstituted C1~C20 alkoxy; substituted or unsubstituted C6~C30 aryloxy; substituted or unsubstituted C6~C40 aryl; substituted or unsubstituted C6~C40 aralkyl; C6~C40 heteroaryl containing a hetero element of Group 14, 15 or 16; substituted or unsubstituted C6~C40 alkoxyaryl; cyano; nitrile; nitro; and hydroxyl, and $R_{15}$ is one or two substituents which are each independently selected from the group consisting of hydrogen; halogen; cyano; substituted or unsubstituted C1~C20 alkyl; substituted or unsubstituted C1~C20 alkoxy; substituted or unsubstituted C6~C30 aryloxy; substituted or unsubstituted C6~C40 aryl; C6~C40 heteroaryl containing a hetero element of Group 14, 15 or 16; and substituted or unsubstituted C6~C40 alkoxyaryl.

The photo-alignment polymer is configured such that a norbornene-based backbone is coupled with at least one photo-reactive group, for example, a cinnamate-based functional group, a chalcone-based functional group, an azo-based functional group, or a coumarin-based functional group, and the photo-alignment polymer may exhibit superior photo-alignability and makes it possible to obtain the appropriate P (polarity) of the photo-alignment layer ranging from about 0.02 to 0.28, due to the configuration in which the photo-reactive group is linked to the end of the norbornene-based backbone, and the kind and structure of the photo-reactive group.

For example, in the case where a cellulose-based substrate such as TAC having P (polarity) of about 0.30 to 0.35 or about 0.31 to 0.32 is applied, useful is a photo-alignment polymer configured such that a bulky functional group including alkoxy or alkoxyaryl is linked to the end of the photo-reactive group, for example, a photo-alignment polymer in which at least one of $R_{10}$ to $R_{14}$ in the photo-reactive group of Chemical Formulas 1a to 1e represents substituted or unsubstituted C1~C20 alkoxy or substituted or unsubstituted C6~C40 alkoxyaryl. More particularly, the photo-alignment polymer may be a homopolymer composed exclusively of a single repeating unit of Chemical Formula 1 having a photo-reactive group of Chemical Formula 1a in which Position 4 of the terminal benzene ring, that is, $R_{14}$, represents C1~C5 alkoxy such as methoxy. Therefore, it is easier to properly adjust P (polarity) of the photo-alignment layer to about 0.02 to 0.2.

Alternatively, in the case where a COC or COP substrate or a PET substrate having P (polarity) of about 0.01 to 0.03 or about 0.01 to 0.02 is applied, useful is a photo-alignment polymer configured such that a bulky functional group including halogen or aralkyl is linked to the end of the photo-reactive group, for example, a photo-alignment polymer in which at least one of $R_{10}$ to $R_{14}$ in the photo-reactive group of Chemical Formulas 1a to 1e represents halogen, C1~C20 alkyl substituted with halogen, or substituted or unsubstituted C6~C40 aralkyl. More particularly, the photo-alignment polymer may be a homopolymer composed exclusively of a single repeating unit of Chemical Formula 1 having a photo-reactive group of Chemical Formula 1a in which Position 4 of the terminal benzene ring, that is, $R_{14}$, represents halogen such as fluorine, D and D' are a simple bond, and l is 0 (in which there is no linker between the photo-reactive group of Chemical Formula 1a and the backbone of Chemical Formula 1). Therefore, it is easier to properly adjust P (polarity) of the photo-alignment layer to about 0.06 to 0.28.

Consequently, the optimal surface energy of the structure under the liquid crystal layer is achieved, and thus the optical anisotropic film according to an embodiment of the present invention may exhibit superior characteristics and stability of liquid crystal alignment.

Meanwhile, examples of the photo-alignment polymer having a repeating unit of Chemical Formula 1 or 2 may include those disclosed in Korean Patent Nos. 1002763, 0789247, 0671753, 0982394, 0946552 and 0955569, and Korean Patent Application Publication Nos. 2009-0037740, 2009-0047720 and 2012-0044883, which may be easily prepared by those skilled in the art via methods disclosed in these documents.

In the repeating units of Chemical Formulas 1 and 2, the non-hydrocarbonaceous polar group may be selected from the following functional groups, and may represent various polar functional groups, in addition thereto:
—$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)k\text{-}OR_6$, —$(OR_5)k\text{-}OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$—, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$,

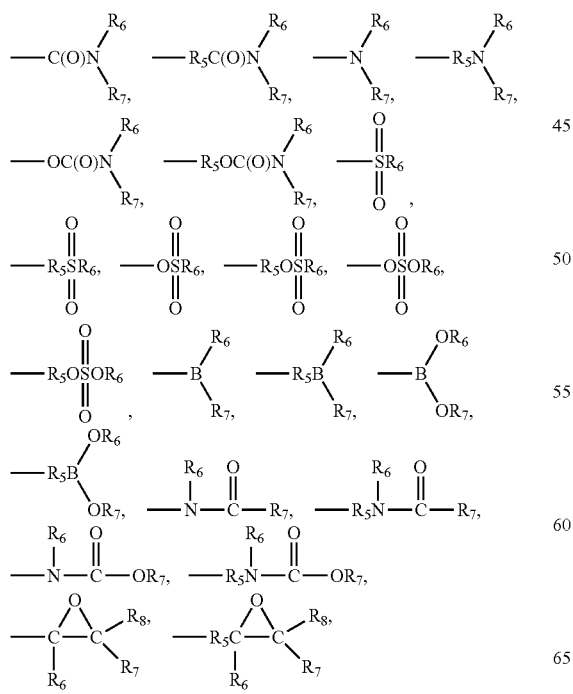

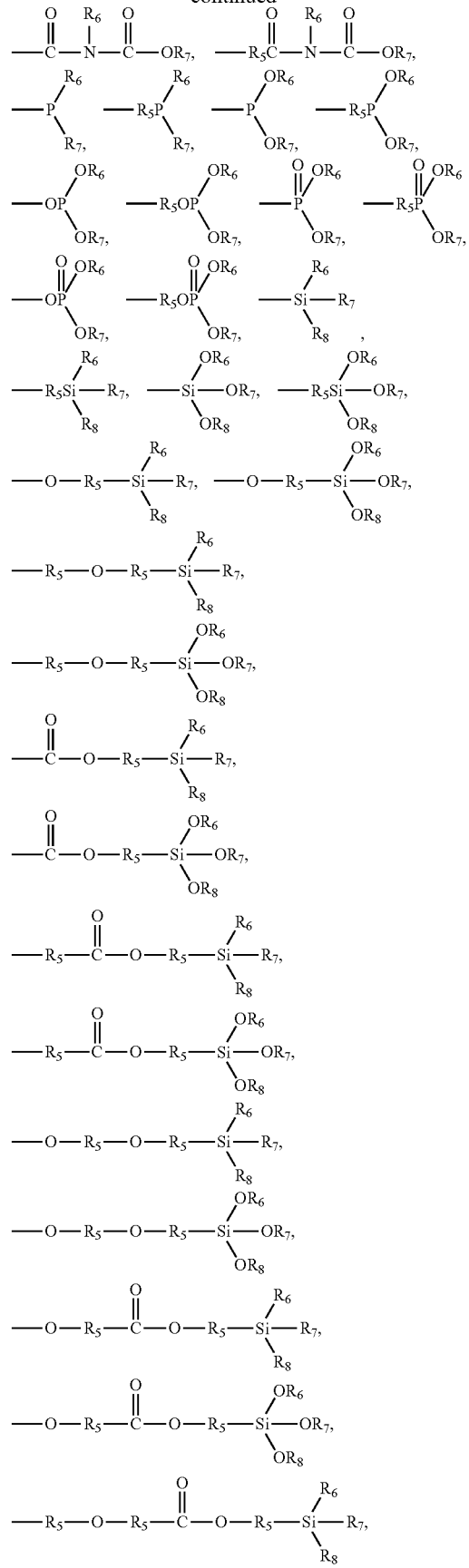

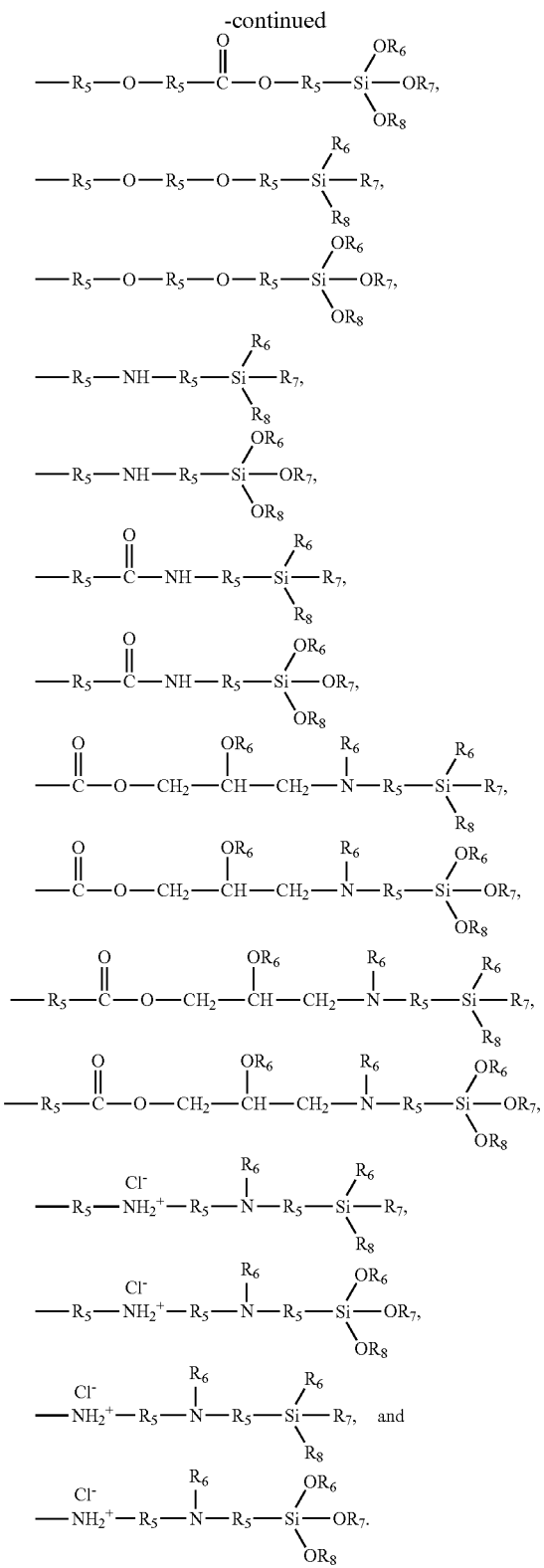

In the polar functional groups as above, $R_5$ radicals are identical to or different from each other and are each independently C1~C20 linear or branched alkylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C2~C20 linear or branched alkenylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C3~C20 linear or branched alkynylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C3~C12 cycloalkylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C6~C40 arylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C1~C20 alkoxylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; or C1~C20 carbonyloxylene unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy, and $R_6$, $R_7$ and $R_8$ are identical to or different from each other and are each independently hydrogen; halogen; C1~C20 linear or branched alkyl unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C2~C20 linear or branched alkenyl unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C3~C20 linear or branched alkynyl unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C3~C12 cycloalkyl unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C6~C40 aryl unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; C1~C20 alkoxy unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy; or C1~C20 carbonyloxy unsubstituted or substituted with at least one substituent selected from among halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl and siloxy, and k is each independently an integer of 1 to 10.

Also, in the repeating units of Chemical Formulas 1 and 2, a C6~C40 heteroaryl group containing a hetero element of Group 14, 15 or 16, or a C6~C40 aryl group may include, but is not limited to, at least one selected from the following functional groups:

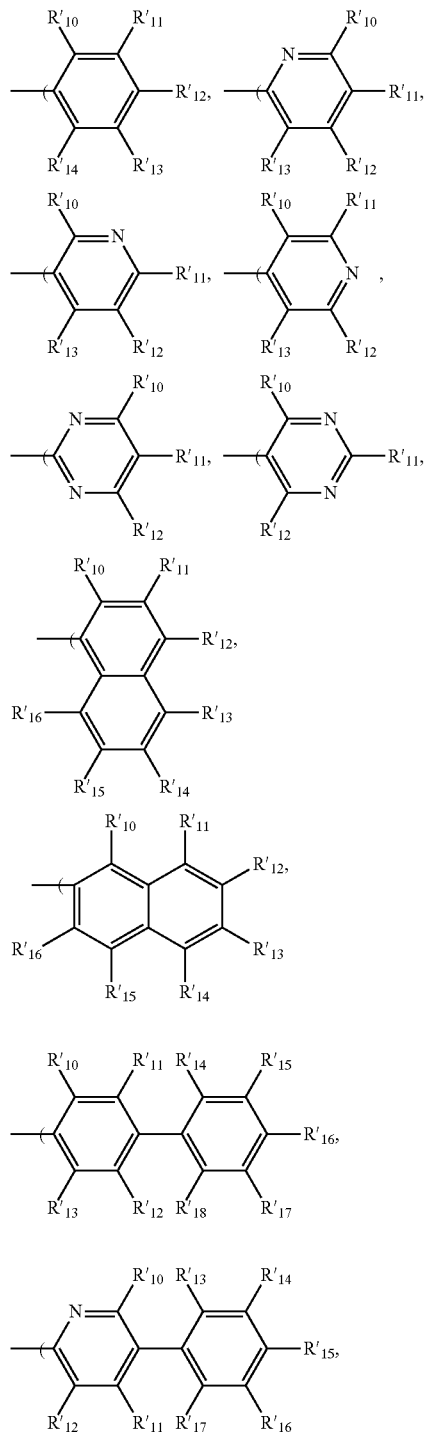

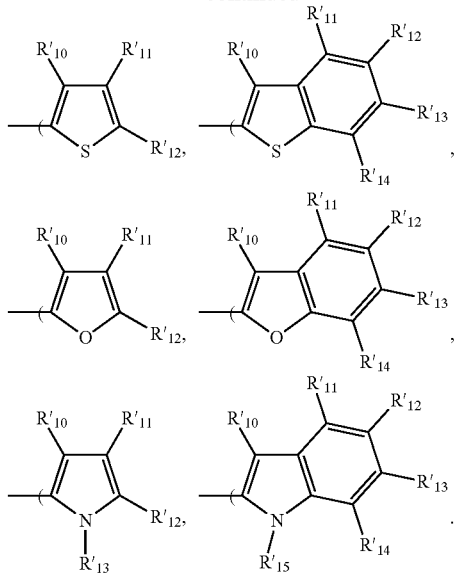

In the above chemical formulas, at least one of $R'_{10}$, $R'_{11}$, $R'_{12}$, $R'_{13}$, $R'_{14}$, $R'_{15}$, $R'_{16}$, $R'_{17}$, and $R'_{18}$ is substituted or unsubstituted C1~C20 alkoxy or substituted or unsubstituted C6~C30 aryloxy, and the others are identical to or different from each other and are each independently substituted or unsubstituted C1~C20 alkyl, substituted or unsubstituted C1~C20 alkoxy, substituted or unsubstituted C6~C30 aryloxy, or substituted or unsubstituted C6~C40 aryl.

The photo-alignment polymer may be either a homopolymer composed of a single repeating unit of Chemical Formula 1 or 2 or a copolymer having two or more repeating units.

In the configuration of the photo-alignment polymer as above, individual substituents may be defined as follows.

As used herein, the term "alkyl" refers to a linear or branched saturated monovalent hydrocarbon moiety of 1 to 20, preferably 1 to 10 and more preferably 1 to 6 carbon atoms. The alkyl group may be inclusive of not only those unsubstituted but also those further substituted with a predetermined substituent as will be described later. Examples of the alkyl group may include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, etc.

The term "alkenyl" refers to a linear or branched monovalent hydrocarbon moiety of 2 to 20, preferably 2 to 10 and more preferably 2 to 6 carbon atoms, with at least one carbon-carbon double bond. The alkenyl group may be linked via carbon atoms including a carbon-carbon double bond or via saturated carbon atoms. The alkenyl group may be inclusive of not only those unsubstituted but also those further substituted with a predetermined substituent as will be described later. Examples of the alkenyl group may include ethenyl, 1-propenyl, 2-propenyl, 2-butenyl, 3-butenyl, pentenyl, 5-hexenyl, dodecenyl, etc.

The term "cycloalkyl" refers to a saturated or unsaturated non-aromatic monovalent monocyclic, bicyclic or tricyclic hydrocarbon moiety of 3 to 12 ring carbons, and may be inclusive of those further substituted with a predetermined substituent as will be described later. Examples thereof may include cyclopropyl, cyclobutyl, cyclopentyl, cyclopentenyl, cyclohexyl, cyclohexenyl, cycloheptyl, cyclooctyl, decahydronaphthalenyl, adamantly, norbornyl (i.e. bicyclo[2,2,1] hep-5-enyl), etc.

The term "aryl" refers to a monovalent monocyclic, bicyclic or tricyclic aromatic hydrocarbon moiety having 6 to 40 and preferably 6 to 12 ring atoms, and may be inclusive of those further substituted with a predetermined substituent as will be described later. Examples of the aryl group may include phenyl, naphthalenyl, fluorenyl, etc.

The term "alkoxyaryl" refers to an aryl radical in which at least one hydrogen atom of the aryl group defined above is substituted with an alkoxy group. Examples of the alkoxyaryl group may include methoxyphenyl, ethoxyphenyl, propoxyphenyl, butoxyphenyl, pentoxyphenyl, hexoxyphenyl, heptoxy, octoxy, nanoxy, methoxybiphenyl, methoxynaphthalenyl, methoxyfluorenyl, methoxyanthracenyl, etc.

The term "aralkyl" refers to an alkyl radical in which at least one hydrogen atom of the alkyl group defined above is substituted with an aryl group, and may be inclusive of those further substituted with a predetermined substituent as will be described later. Examples thereof may include benzyl, benzhydryl, trityl, etc.

The term "alkynyl" refers to a linear or branched monovalent hydrocarbon moiety of 2 to 20, preferably 2 to 10 and more preferably 2 to 6 carbon atoms, with at least one carbon-carbon triple bond. The alkynyl group may be linked via carbon atoms including a carbon-carbon triple bond or via saturated carbon atoms. The alkynyl group may be inclusive of those further substituted with a predetermined substituent as will be described later. Examples thereof may include ethynyl, propynyl, etc.

The term "alkylene" refers to a linear or branched saturated bivalent hydrocarbon moiety of 1 to 20, preferably 1 to 10 and more preferably 1 to 6 carbon atoms. The alkylene group may be inclusive of those further substituted with a predetermined substituent as will be described later. Examples of the alkylene group may include methylene, ethylene, propylene, butylene, hexylene, etc.

The term "alkenylene" refers to a linear or branched bivalent hydrocarbon moiety of 2 to 20, preferably 2 to 10 and more preferably 2 to 6 carbon atoms, with at least one carbon-carbon double bond. The alkenylene group may be linked via carbon atoms including a carbon-carbon double bond and/or via saturated carbon atoms, and may be inclusive of those further substituted with a predetermined substituent as will be described later.

The term "cycloalkylene" refers to a saturated or unsaturated non-aromatic bivalent monocyclic, bicyclic or tricyclic hydrocarbon moiety of 3 to 12 ring carbons, and may be inclusive of those further substituted with a predetermined substituent as will be described later. Examples thereof may include cyclopropylene, cyclobutylene, etc.

The term "arylene" refers to a bivalent monocyclic, bicyclic or tricyclic aromatic hydrocarbon moiety having 6 to 20 and preferably 6 to 12 ring atoms, and may be inclusive of those further substituted with a predetermined substituent as will be described later. The aromatic moiety contains only carbon atoms. Examples of the arylene group may include phenylene, etc.

The term "aralkylene" refers to a bivalent moiety in which at least one hydrogen atom of the alkyl group defined above is substituted with an aryl group, and may be inclusive of those further substituted with a predetermined substituent as will be described later. Examples thereof may include benzylene, etc.

The term "alkynylene" refers to a linear or branched bivalent hydrocarbon moiety of 2 to 20, preferably 2 to 10 and more preferably 2 to 6 carbon atoms, with at least one carbon-carbon triple bond. The alkynylene group may be linked via carbon atoms including a carbon-carbon triple bond or via saturated carbon atoms, and may be inclusive of those further substituted with a predetermined substituent as will be described later. Examples thereof may include ethynylene, propynylene, etc.

The aforementioned substituents, which are substituted or unsubstituted, mean to be inclusive of not only these individual substituents themselves but also those further substituted with a predetermined substituent. Herein, examples of the substituent used to further substitute individual substituents may include halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, siloxy, etc.

The method of preparing the photo-alignment polymer is well known to those skilled in the art, as disclosed in a variety of documents related with various photo-alignment polymers, as mentioned above.

For example, in the case where the photo-alignment polymer has a repeating unit of Chemical Formula 1, it may be prepared by subjecting a monomer of Chemical Formula 1a to addition polymerization in the presence of a catalyst composition containing a pre-catalyst having a transition metal of Group 10 and a promoter, thus forming the repeating unit of Chemical Formula 1:

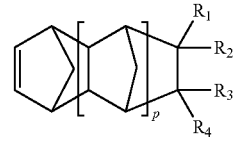

[Chemical Formula 1a]

in Chemical Formula 1a, p, $R_1$, $R_2$, $R_3$ and $R_4$ are as defined in Chemical Formula 1.

Also, in the case where the photo-alignment polymer has a repeating unit of Chemical Formula 2, it may be prepared by subjecting a monomer of Chemical Formula 1a to ring-opening polymerization in the presence of a catalyst composition containing a precatalyst having a transition metal of Group 4, 6 or 8 and a promoter, thus forming the repeating unit of Chemical Formula 2. Alternatively, the photo-alignment polymer having the repeating unit of Chemical Formula 2 may be prepared by subjecting norbornene (alkyl)ol such as norbornene methanol as a monomer to ring-opening polymerization in the presence of a catalyst composition containing a precatalyst having a transition metal of Group 4, 6 or 8 and a promoter, thus forming a ring-opened polymer having a pentagonal ring, and then introducing a photo-reactive group to the ring-opened polymer. As such, introduction of the photo-reactive group may be carried out by subjecting the ring-opened polymer to condensation with a carboxylic acid compound or an acyl chloride compound having a photo-reactive group corresponding to Chemical Formulas 1a to 1e.

In the ring-opening polymerization step, when hydrogen is added to the double bond of the norbornene ring contained in the monomer of Chemical Formula 1a, a ring-opening reaction may be carried out, and further, polymerization may take place, thereby preparing the repeating unit of Chemical Formula 2 and a photo-reactive polymer including the same.

The specific preparation process and reaction conditions for preparing the photo-alignment polymer are widely known to those skilled in the art, and thus a description thereof is omitted.

The optical anisotropic film according to the above embodiment may further include a cured product of a binder compound, in addition to the photo-alignment polymer, and the cured product of the binder compound may be a crosslinked polymer obtained by photocuring a binder compound including a bifunctional or higher functional acrylate compound.

As such, the binder compound may be selected from among pentaerythritol triacrylate (PETA), tris(2-acryloly-loxyethyl)isocynurate, trimethylolpropane triacrylate, dipentaerythritol hexaacrylate (DPHA), and mixtures of two or more thereof.

Also, in the case where the cured product of the binder compound is contained in the optical anisotropic film, the photo-alignment polymer and the cured product of the binder compound may be contained in the photo-alignment layer at a weight ratio of about 2:0 to 2:3, or about 2:1 to 2:3. As the higher functional acrylate-based binder compound is applied at an appropriate weight ratio with the photo-alignment polymer, the photo-alignment layer having suitable P (polarity) of, for example, about 0.02 to 0.28 may be more effectively obtained.

For example, in the case where a cellulose-based substrate such as TAC having P (polarity) of about 0.30 to 0.35 or about 0.31 to 0.32 is applied, a mixture of DPHA and PETA may be appropriately used as the binder compound, and more particularly useful is a mixture of DPHA and PETA at a weight ratio of about 2:1 to 1:2 or about 1:1. Also, the photo-alignment polymer and the cured product of the binder compound may be contained in the photo-alignment layer at a weight ratio of about 2:0 to 2:3 or about 2:1 to 2:3. Therefore, it is easier to properly adjust P (polarity) of the photo-alignment layer to about 0.02 to 0.2.

Alternatively, in the case where a COC or COP substrate or a PET substrate having P (polarity) of about 0.01 to 0.03 or about 0.01 to 0.02 is applied, DPHA may be properly used as the binder compound. Furthermore, the photo-alignment polymer and the cured product of the binder compound may be contained in the photo-alignment layer at a weight ratio of about 2:0 to 2:3 or about 2:1 to 2:2. Accordingly, the appropriate P (polarity) of the photo-alignment layer, for example, about 0.06 to 0.28, corresponding to the proper P (polarity) of the substrate, may be more easily obtained.

Ultimately, the surface energy of the structure under the liquid crystal layer is optimized, and thus the optical anisotropic film according to an embodiment may exhibit superior characteristics and stability of liquid crystal alignment.

Meanwhile, the liquid crystal layer on the photo-alignment layer may include any liquid crystal compound known as those useful for an optical anisotropic film without particular limitation. Taking into consideration higher interaction with the photo-alignment polymer, the liquid crystal layer may include a liquid crystal compound represented by Chemical Formula 3 below:

in Chemical Formula 3, P is a polymerizable group including an acrylate group, a methacrylate group or an epoxy group, $R_{20}$ is hydrogen or a C1~C6 alkyl group, and n is an integer of 1 to 10.

The optical anisotropic film including the substrate, the photo-alignment layer and the liquid crystal layer is schematically illustrated in FIG. 1. In the optical anisotropic film, the photo-alignment layer may be formed by applying, on the substrate, a photo-alignment layer composition composed of the photo-alignment polymer, the binder compound, and optionally, a photoinitiator and an organic solvent, and optically, drying the solvent contained in the applied composition, and radiating UV onto the applied composition.

As such, the photoinitiator may be any initiator known to initiate and facilitate UV curing, and for example, an initiator under brand name of Irgacure 907 or 819 may be used.

The organic solvent, which may be used to dissolve individual components as above, may be selected from among toluene, anisole, chlorobenzene, dichloroethane, cyclohexane, cyclopentane, propylene glycol methyl ether acetate, and mixtures of two or more thereof. In addition thereto, any solvent may be used so long as individual components are effectively dissolved therein depending on the kind thereof so as to be applied on the substrate.

The photo-alignment layer composition including individual components as above is applied on the substrate, and optionally, the organic solvent is removed, after which the applied composition is irradiated with UV. In this case, at least a portion or all of the photo-reactive group linked to the photo-alignment polymer may be optically aligned, and UV polymerization and/or curing of the binder compound may occur. Ultimately, the photo-alignment layer, including the photo-alignment polymer in which at least a portion of the photo-reactive group is optically aligned, and optionally, the cured product of the binder compound, may be formed on the substrate. As such, the photo-alignment polymer and the binder compound at an appropriate weight ratio are applied on the predetermined substrate, and thereby the substrate and the photo-alignment layer may show appropriate P (polarity) values, respectively, as mentioned above.

Upon applying the composition in the method of forming the photo-alignment layer, the concentration of the solution, the kind of solvent and the coating process may be determined depending on the kinds of photo-alignment polymer, binder compound and photoinitiator. Using the coating process which is exemplified by roll coating, spin coating, printing, inkjet spraying or slit nozzle, the photo-alignment layer composition may be properly applied on the surface of the substrate.

Upon drying the solvent, the solvent may be removed by heating the coating or performing vacuum evaporation. The drying process may be performed at about 50 to 250° C. for about 20 to 90 min.

Upon radiating UV, polarized UV in a wavelength range of about 150 to 450 nm may be radiated onto the dried coating. As such, the intensity of radiated UV may vary depending on the kind of photo-alignment polymer or the

[Chemical Formula 3]

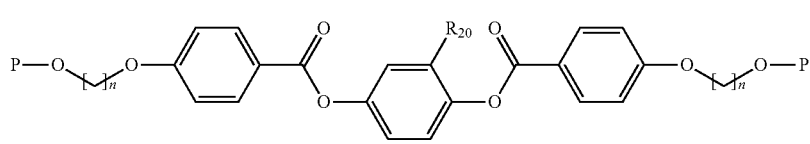

photo-reactive group linked thereto, and an energy of about 50 mJ/cm² to 10 J/cm², and preferably about 500 mJ/cm² to 5 J/cm² may be applied.

The photo-alignment layer thus formed may have a thickness of about 10 to 1000 nm, or about 30 to 1000 nm.

After formation of the photo-alignment layer, the liquid crystal layer may be formed on the photo-alignment layer using a typical process, and liquid crystal molecules contained in the liquid crystal layer may be aligned using the photo-alignment layer. Thereby, the optical anisotropic film according to the embodiment of the present invention may be manufactured, and such an optical anisotropic film has optimal surface energy of the structure under the liquid crystal layer and thus may manifest superior characteristics and stability of liquid crystal alignment.

The optical anisotropic film may play a role as a liquid crystal alignment film, an optical filter, a phase difference film, a patterned phase difference film, a polarizer or a polarized light emitter for use in optical devices such as liquid crystal displays.

According to the present invention, the optical anisotropic film is configured such that liquid crystals of a liquid crystal layer can be more effectively aligned using a photo-alignment layer and superior stability of liquid crystal alignment and excellent interaction between the liquid crystal layer and the photo-alignment layer can be exhibited. The optical anisotropic film is preferably applied to a liquid crystal alignment film, an optical filter, a phase difference film, a patterned phase difference film, a polarizer or a polarized light emitter for use in optical devices, thanks to superior alignment characteristics thereof.

BRIEF DESCRIPTION OF THE DRAWING

FIG. 1 schematically illustrates an optical anisotropic film according to an embodiment of the present invention, including a substrate, a photo-alignment layer and a liquid crystal layer.

DESCRIPTION OF THE PREFERRED EMBODIMENTS

A better understanding of the present invention may be obtained via the following examples which are set forth to illustrate, but are not to be construed as limiting the present invention.

Examples 1 to 3 and Comparative Example 1:
Formation of Optical Anisotropic Film As a photo-alignment polymer, 2.5 wt % of poly[4-(1-phenyl perfluoroheptyloxy)-cinnamate-5-norbornene] was used, and a higher functional acrylate compound (pentaerythritol triacrylate (PETA)) as a binder compound was used so that the weight ratio of the photo-alignment polymer to the binder compound was 2:0, 2:1, 2:2 and 2:4. Along with the photo-alignment polymer and the binder compound, 0.1 wt % of a photoinitiator (Irgacure 907, available from Ciba) was dissolved in a toluene solvent, and the resulting solution was applied to a thickness of about 100 nm on a TAC film using bar coating, dried at 80° C. for 2 min and then irradiated with polarized UV of UV-B at a dose of 1 J/cm², thereby forming optical anisotropic films of Examples 1 to 3 and Comparative Example 1.

Examples 4 to 6 and Comparative Example 2:
Formation of Optical Anisotropic Film Optical anisotropic films of Examples 4 to 6 and Comparative Example 2 were formed in the same manner as in Examples 1 to 3 and Comparative Example 1, with the exception that a COP film was used as the substrate, in lieu of the TAC film.

Examples 7 to 9 and Comparative Example 3:
Formation of Optical Anisotropic Film Optical anisotropic films of Examples 7 to 9 and Comparative Example 3 were formed in the same manner as in Examples 1 to 3 and Comparative Example 1, with the exception that a COC film was used as the substrate, in lieu of the TAC film.

Examples 10 to 12 and Comparative Example 4:
Formation of Optical Anisotropic Film Optical anisotropic films of Examples 10 to 12 and Comparative Example 4 were formed in the same manner as in Examples 1 to 3 and Comparative Example 1, with the exception that a PET film was used as the substrate, in lieu of the TAC film.

Examples 13 to 15 and Comparative Example 5:
Formation of Optical Anisotropic Film Optical anisotropic films of Examples 13 to 15 and Comparative Example 5 were formed in the same manner as in Examples 1 to 3 and Comparative Example 1, with the exception that poly[4-(4-methylketone benzyloxy)-cinnamate-5-norbornene] was used as the photo-alignment polymer, in lieu of poly[4-(1-phenyl perfluoroheptyloxy)-cinnamate-5-norbornene].

Examples 16 to 18 and Comparative Example 6:
Formation of Optical Anisotropic Film Optical anisotropic films of Examples 16 to 18 and Comparative Example 6 were formed in the same manner as in Examples 13 to 15 and Comparative Example 5, with the exception that a COP film was used as the substrate, in lieu of the TAC film.

Examples 19 to 21 and Comparative Example 7:
Formation of Optical Anisotropic Film Optical anisotropic films of Examples 19 to 21 and Comparative Example 7 were formed in the same manner as in Examples 13 to 15 and Comparative Example 5, with the exception that a COC film was used as the substrate, in lieu of the TAC film.

Examples 22 to 24 and Comparative Example 8:
Formation of Optical Anisotropic Film Optical anisotropic films of Examples 22 to 24 and Comparative Example 8 were formed in the same manner as in Examples 13 to 15 and Comparative Example 5, with the exception that a PET film was used as the substrate, in lieu of the TAC film.

Examples 25 to 27 and Comparative Example 9:
Formation of Optical Anisotropic Film Optical anisotropic films of Examples 25 to 27 and Comparative Example 9 were formed in the same manner as in Examples 1 to 3 and Comparative Example 1, with the exception that poly[(3,4-difluoro)-cinnamate-2-methyl5- norbornene] was used as the photo-alignment polymer, in lieu of poly[4-(1-phenyl perfluoroheptyloxy)-cinnamate-5-norbornene].

Examples 28 to 30 and Comparative Example 10: Formation of Optical Anisotropic Film Optical anisotropic films of Examples 28 to 30 and Comparative Example 10 were formed in the same manner as in Examples 25 to 27 and Comparative Example 9, with the exception that a COP film was used as the substrate, in lieu of the TAC film.

Examples 31 to 33 and Comparative Example 11: Formation of Optical Anisotropic Film Optical anisotropic films of Examples 31 to 33 and Comparative Example 11 were formed in the same manner as in Examples 25 to 27 and Comparative Example 9, with the exception that a COC film was used as the substrate, in lieu of the TAC film.

Examples 34 to 36 and Comparative Example 12: Formation of Optical Anisotropic Film Optical anisotropic films of Examples 34 to 36 and Comparative Example 12 were formed in the same manner as in Examples 25 to 27 and Comparative Example 9, with the exception that a PET film was used as the substrate, in lieu of the TAC film.

Example 37: Formation of Optical Anisotropic Film

As a photo-alignment polymer, 2.0 wt % of poly[4-fluoro-cinnamate-5-norbornene] was used, and a higher functional acrylate compound (PETA) as a binder compound was used so that the weight ratio of the photo-alignment polymer to the binder compound was 2:2. Along with the photo-alignment polymer and the binder compound, 0.1 wt % of a photoinitiator (Irgacure 907, available from Ciba) was dissolved in a cyclopentanone (CPO) solvent, and the resulting solution was applied to a thickness of about 100 nm on a COP film using bar coating, dried at 80° C. for 2 min and then irradiated with polarized UV of UV-B at a dose of 1 J/cm$^2$, thereby forming an optical anisotropic film of Example 37.

Example 38: Formation of Optical Anisotropic Film

As a photo-alignment polymer, 2.0 wt % of poly[4-methoxy-cinnamate-5-norbornene] was used, and a higher functional acrylate compound (a mixture of PETA and DPHA mixed at a weight ratio of 1:1) as a binder compound was used so that the weight ratio of the photo-alignment polymer to the binder compound was 2:1. Along with the photo-alignment polymer and the binder compound, 0.1 wt % of a photoinitiator (Irgacure 907, available from Ciba) was dissolved in a toluene solvent, and the resulting solution was applied to a thickness of about 100 nm on a TAC film using bar coating, dried at 80° C. for 2 min and then irradiated with polarized UV of UV-B at a dose of 1 J/cm$^2$, thereby forming an optical anisotropic film of Example 38.

Test Example 1: Measurement and Calculation of P (Polarity)

In the optical anisotropic films of Examples 1 to 38 and Comparative Examples 1 to 12, the P (polarity) values of the substrate and the photo-alignment layer were determined as follows.

At room temperature of about 25° C., about 10 μl of a water drop and about 4 μl of a diiodomethane drop were positioned on the surface of the substrate and the photo-alignment layer (i.e. respective liquid drops were gently formed and positioned on the surface of the substrate or the photo-alignment layer), after which the angles of contact between the surface of the substrate or the photo-alignment layer and respective liquid drops were measured using a Sessile drop process, thus deducing the measurement values of contact angles for the water drop and the diiodomethane drop. As such, the contact angles were measured using a Drop Shape Analyzer (DSA 100).

The deduced contact angles of the water drop and the diiodomethane drop were substituted into the Owens-Wendt-Rabel-Kaelble equation, thus calculating values of IFT(s, P) and IFT(s) for the surface of the substrate or the photo-alignment layer. The P (polarity) values of the substrate and the photo-alignment layer were calculated based on P (polarity)=IFT(s, P)/IFT(s) of Equation 1. These P (polarity) values are summarized in Tables 1 to 3 below.

Test Example 2: Evaluation of Alignability

Liquid crystals for A-plate were applied onto the photo-alignment layer of the optical anisotropic film of each of Examples 1 to 38 and Comparative Examples 1 to 12, dried at 60° C. for 2 min, and then irradiated with UV at 50 mJ and thus cured. Furthermore, the film was interposed between polarizing plates and the extent of alignment was measured. The extent of alignment was evaluated by integers of 1 to 5 and judged to be superior as close to 5 based on the following criteria. The results of evaluation of alignability are summarized in Tables 1 to 3 below.

5. excellent alignability;
4. good alignability;
3. alignability is observed but poor when actually used;
2. almost no alignability;
1. no alignability.

TABLE 1

| | Substrate | P (polarity) of Substrate | P (polarity) of Photo-alignment layer | Alignability |
|---|---|---|---|---|
| Ex. 1 | TAC | 0.32 | 0.04 | 5 |
| Ex. 2 | TAC | 0.32 | 0.1 | 5 |
| Ex. 3 | TAC | 0.32 | 0.13 | 5 |
| C. Ex. 1 | TAC | 0.32 | 0.22 | 2 |
| Ex. 4 | COP | 0.01 | 0.08 | 4 |
| Ex. 5 | COP | 0.01 | 0.14 | 5 |
| Ex. 6 | COP | 0.01 | 0.22 | 4 |
| C. Ex. 2 | COP | 0.01 | 0.29 | 1 |
| Ex. 7 | COC | 0.01 | 0.09 | 4 |
| Ex. 8 | COC | 0.01 | 0.12 | 5 |
| Ex. 9 | COC | 0.01 | 0.23 | 4 |
| C. Ex. 3 | COC | 0.01 | 0.29 | 2 |
| Ex. 10 | PET | 0.03 | 0.09 | 4 |
| Ex. 11 | PET | 0.03 | 0.1 | 5 |
| Ex. 12 | PET | 0.03 | 0.2 | 4 |
| C. Ex. 4 | PET | 0.03 | 0.32 | 1 |

TABLE 2

| | Substrate | P (polarity) of Substrate | P (polarity) of Photo-alignment layer | Alignability |
|---|---|---|---|---|
| Ex. 13 | TAC | 0.32 | 0.08 | 5 |
| Ex. 14 | TAC | 0.32 | 0.1 | 5 |
| Ex. 15 | TAC | 0.32 | 0.12 | 5 |
| C. Ex. 5 | TAC | 0.32 | 0.21 | 2 |

TABLE 2-continued

| | Substrate | P (polarity) of Substrate | P (polarity) of Photo-alignment layer | Alignability |
|---|---|---|---|---|
| Ex. 16 | COP | 0.01 | 0.12 | 4 |
| Ex. 17 | COP | 0.01 | 0.15 | 5 |
| Ex. 18 | COP | 0.01 | 0.21 | 4 |
| C. Ex. 6 | COP | 0.01 | 0.3 | 1 |
| Ex. 19 | COC | 0.01 | 0.09 | 4 |
| Ex. 20 | COC | 0.01 | 0.13 | 5 |
| Ex. 21 | COC | 0.01 | 0.21 | 4 |
| C. Ex. 7 | COC | 0.01 | 0.29 | 1 |
| Ex. 22 | PET | 0.03 | 0.1 | 4 |
| Ex. 23 | PET | 0.03 | 0.13 | 5 |
| Ex. 24 | PET | 0.03 | 0.19 | 4 |
| C. Ex. 8 | PET | 0.03 | 0.3 | 2 |

TABLE 3

| | Substrate | P (polarity) of Substrate | P (polarity) of Photo-alignment layer | Alignability |
|---|---|---|---|---|
| Ex. 25 | TAC | 0.32 | 0.05 | 4 |
| Ex. 26 | TAC | 0.32 | 0.08 | 5 |
| Ex. 27 | TAC | 0.32 | 0.18 | 4 |
| C. Ex. 9 | TAC | 0.32 | 0.27 | 1 |
| Ex. 28 | COP | 0.01 | 0.08 | 4 |
| Ex. 29 | COP | 0.01 | 0.12 | 5 |
| Ex. 30 | COP | 0.01 | 0.23 | 4 |
| C. Ex. 10 | COP | 0.01 | 0.34 | 2 |
| Ex. 31 | COC | 0.01 | 0.06 | 4 |
| Ex. 32 | COC | 0.01 | 0.1 | 4 |
| Ex. 33 | COC | 0.01 | 0.22 | 4 |
| C. Ex. 11 | COC | 0.01 | 0.3 | 1 |
| Ex. 34 | PET | 0.03 | 0.09 | 5 |
| Ex. 35 | PET | 0.03 | 0.12 | 5 |
| Ex. 36 | PET | 0.03 | 0.22 | 4 |
| C. Ex. 12 | PET | 0.03 | 0.31 | 2 |
| Ex. 37 | COP | 0.01 | 0.13 | 5 (Greatest) |
| Ex. 38 | TAC | 0.32 | 0.09 | 5 (Greatest) |

As is apparent from Tables 1 to 3, the optical anisotropic films of Examples 1 to 38 including the substrate and the photo-alignment layer having appropriate P (polarity) values exhibited superior alignability. In particular, the optical anisotropic films of Examples 37 and 38 manifested the greatest alignability.

However, the optical anisotropic films of Comparative Examples 1 to 12 including the photo-alignment layer falling out of the P (polarity) range adapted for P (polarity) of the substrate exhibited inferior alignability.

What is claimed is:

1. An optical anisotropic film, comprising:
   a substrate having polarity of 0.30 to 0.35 as defined by Equation 1:

polarity=$IFT(s,P)/IFT(s)$ [Equation 1]

wherein $IFT(s,P)$ and $IFT(s)$ are values obtained by substituting contact values of a water drop and a diiodomethane drop measured by positioning 10 μL of a water drop and 4 μL of a diiodomethane drop on a surface of the substrate or the photo-alignment layer, into an Owens-Wendt-Rabel-Kaelble equation;
   a photo-alignment layer formed on the substrate, the photo-alignment layer having a polarity of 0.02 to 0.2 as defined by Equation 1 above, and including a photo-alignment polymer in which at least a portion of a photo-reactive group is optically aligned and a cured product of a binder compound, wherein the binder compound is a mixture of dipentaerythritol hexaacrylate (DPHA) and pentaerythritol triacrylate (PETA) at a weight ratio of 2:1 to 1:2, and the photo-alignment polymer and the cured product of the binder compound are contained in the photo-alignment layer at a weight ratio of 1:1; and
   a liquid crystal layer formed on the photo-alignment layer,
   wherein the photo-alignment polymer includes a repeating unit of Chemical Formula 1 or 2:

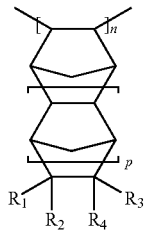

[Chemical Formula 1]

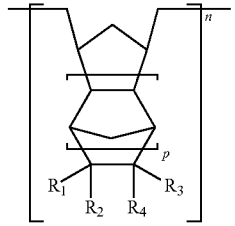

[Chemical Formula 2]

wherein:
   n is 50 to 5,000;
   p is an integer of 0 to 4;
   at least one of $R_1$, $R_2$, $R_3$ and $R_4$ is a radical selected from the group consisting of Chemical Formulas 1a to 1e and the others are identical to or different from each other and are each independently a polar functional group selected from the group consisting of hydrogen, halogen, substituted or unsubstituted C1-C20 alkyl, substituted or unsubstituted C2-C20 alkenyl, substituted or unsubstituted C5-C12 cycloalkyl, substituted or unsubstituted C6-C40 aryl, substituted or unsubstituted C7-C15 aralkyl, substituted or unsubstituted C2-C20 alkynyl, and a non-hydrocarbonaceous polar group containing at least one element selected from oxygen, nitrogen, phosphorus, sulfur, silicon and boron:

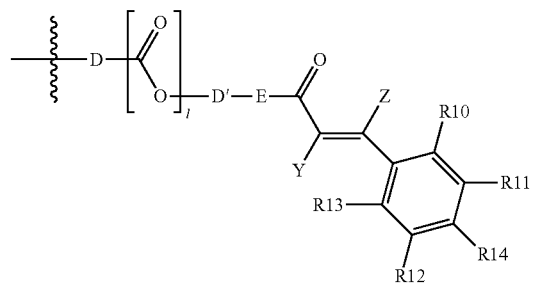

[Chemical Formula 1a]

[Chemical Formula 1b]

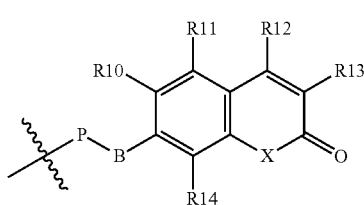

[Chemical Formula 1c]

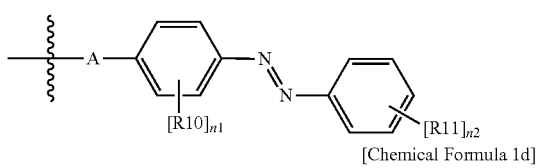

[Chemical Formula 1d]

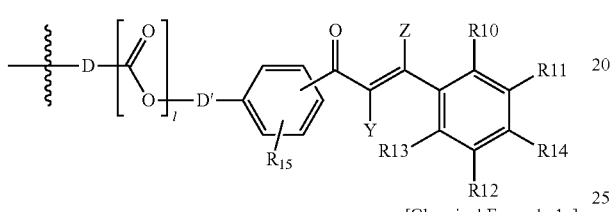

[Chemical Formula 1e]

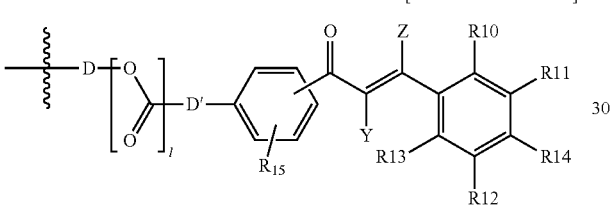

wherein in Chemical formulas 1a to 1e:
n1 is an integer of 0 to 4;
n2 is an integer of 0 to 5;
l is 0 or 1;
A is a substituted or unsubstituted C1-C20 alkylene, carbonyl, carboxyl, substituted or unsubstituted C6-C40 arylene, or a single bond;
B is selected from the group consisting of a single bond, substituted or unsubstituted C1-C20 alkylene, carbonyl, carboxyl, ester, substituted or unsubstituted C1-C10 alkoxylene, substituted or unsubstituted C6-C40 arylene, and substituted or unsubstituted C6-C40 heteroarylene;
D and D' are each independently selected from the group consisting of a single bond, oxygen, substituted or unsubstituted C1-C20 alkylene, substituted or unsubstituted C3-C12 cycloalkylene, and substituted or unsubstituted C1-C20 alkyleneoxide;
E is a single bond, substituted or unsubstituted C1-C20 alkylene, or substituted or unsubstituted C6-C40 aryleneoxide;
X is oxygen or sulfur;
Y and Z are each independently hydrogen, or substituted or unsubstituted C1-C20 alkyl;
P is selected from the group consisting of a single bond, substituted or unsubstituted C1-C20 alkylene, carbonyl, substituted or unsubstituted C2-C20 alkenylene, substituted or unsubstituted C3-C12 cycloalkylene, substituted or unsubstituted C6-C40 arylene, substituted or unsubstituted C7-C15 aralkylene, substituted or unsubstituted C2-C20 alkynylene, and substituted or unsubstituted C4-C8 cycloalkylene;
R10, R11, R12, R13 and R14 are identical to or different from each other and are each independently selected from the group consisting of hydrogen, halogen, substituted or unsubstituted C1-C20 alkyl, substituted or unsubstituted C4-C8 cycloalkyl, substituted or unsubstituted C1-C20 alkoxy, substituted or unsubstituted C6-C30 aryloxy, substituted or unsubstituted C6-C40 aryl, substituted or unsubstituted C6-C40 aralkyl, C6-C40 heteroaryl containing a hetero element of Group 14, 15 or 16, substituted or unsubstituted C6-C40 alkoxyaryl, cyano, nitrile, nitro, and hydroxyl, and at least one of R10 to R14 is a substituted or unsubstituted C6-C40 alkoxyaryl; and
$R_{15}$ is one or two substituents which are each independently selected from the group consisting of hydrogen, halogen, cyano, substituted or unsubstituted C1-C20 alkyl, substituted or unsubstituted C1-C20 alkoxy, substituted or unsubstituted C6-C30 aryloxy, substituted or unsubstituted C6-C40 aryl, C6-C40 heteroaryl containing a hetero element of Group 14, 15 or 16, and substituted or unsubstituted C6-C40 alkoxyaryl.

2. The optical anisotropic film of claim 1, wherein the substrate is a triacetyl cellulose (TAC) substrate.

3. The optical anisotropic film of claim 1, wherein the liquid crystal layer includes a liquid crystal compound of Chemical Formula 3:

[Chemical Formula 3]

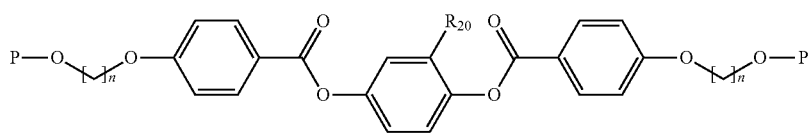

wherein:
P is a polymerizable group including an acrylate group, a methacrylate group or an epoxy group;
$R_{20}$ is hydrogen or a C1-C6 alkyl group; and
n is an integer of 1 to 10.

4. The optical anisotropic film of claim 1, wherein the photo-alignment polymer is a homopolymer of Chemical Formula 1 having a photo-reactive group of Chemical Formula 1a in which $R_{14}$ is C1-C5 alkoxy.

5. The optical anisotropic film of claim 1, wherein the photo-alignment layer has a thickness of 10 to 1000 nm.

6. The optical anisotropic film of claim 1, which functions as a liquid crystal alignment film, an optical filter, a phase difference film, a patterned phase difference film, a polarizer or a polarized light emitter.

7. An optical device, comprising the optical anisotropic film of claim 1.

* * * * *